(12) United States Patent
Shafron

(10) Patent No.: US 7,185,333 B1
(45) Date of Patent: Feb. 27, 2007

(54) METHOD AND SYSTEM FOR MANAGING THE RESOURCES OF A TOOLBAR APPLICATION PROGRAM

(75) Inventor: Thomas J. Shafron, San Francisco, CA (US)

(73) Assignee: Yahoo! Inc., Sunnyvale, CA (US)

(*) Notice: Subject to any disclaimer, the term of this patent is extended or adjusted under 35 U.S.C. 154(b) by 439 days.

(21) Appl. No.: 09/587,075

(22) Filed: Jun. 2, 2000

Related U.S. Application Data

(63) Continuation-in-part of application No. 09/429,585, filed on Oct. 28, 1999, now Pat. No. 7,107,548.

(51) Int. Cl.
*G06F 9/44* (2006.01)

(52) U.S. Cl. ........................................ 717/173; 345/744

(58) Field of Classification Search ........ 717/101–103, 717/117, 120–121, 125, 130, 134–135, 158, 717/165, 167, 171–178, 153; 345/703, 744–745, 345/747, 749
See application file for complete search history.

(56) References Cited

U.S. PATENT DOCUMENTS

| | | | |
|---|---|---|---|
| 5,499,335 A | 3/1996 | Silver et al. ................. | 395/161 |
| 5,630,042 A | 5/1997 | McIntosh et al. ............ | 345/744 |
| 5,744,787 A | 4/1998 | Teicher ....................... | 235/380 |
| 5,781,724 A | 7/1998 | Nevarez et al. | |
| 5,784,058 A | 7/1998 | LaStrange et al. .......... | 345/738 |
| 5,796,393 A | 8/1998 | MacNaughton et al. | |
| 5,802,530 A | 9/1998 | Van Hoff .................... | 715/513 |
| 5,805,803 A | 9/1998 | Birrell et al. | |
| 5,813,007 A | 9/1998 | Nielsen ........................ | 707/10 |
| 5,848,424 A | 12/1998 | Scheinkman et al. ....... | 707/501 |
| 5,875,296 A | 2/1999 | Shi et al. ................ | 395/188.01 |
| 5,877,759 A | 3/1999 | Bauer ......................... | 719/317 |
| 5,883,810 A | 3/1999 | Franklin et al. ............ | 700/232 |
| 5,890,172 A | 3/1999 | Borman et al. .......... | 715/501.1 |

(Continued)

FOREIGN PATENT DOCUMENTS

WO    WO 00/25239 A1    5/2000

(Continued)

OTHER PUBLICATIONS

Alexa Internet Website. Archived Feb. 9, 1998 at http://web.archieve.org.

(Continued)

*Primary Examiner*—Kakali Chaki
*Assistant Examiner*—Tuan Vu
(74) *Attorney, Agent, or Firm*—James J. DeCarlo; Greenberg Traurig LLP

(57) ABSTRACT

A software resource manager is stored on a client computer and maintains a map of unique identifiers to resources, so as to determine those resources that are stored locally on the client computer and those resources that must be retrieved from a server system. The resource manager is further programmed to either pass the resources to one or more software applications, e.g. a toolbar application, or respond to a function call from the software application indicating that resources are needed. In this way, one or more software applications can be internationalized or customized without the need to distribute all of the resources for the application and without the need to restart the application.

16 Claims, 10 Drawing Sheets

U.S. PATENT DOCUMENTS

| | | | |
|---|---|---|---|
| 5,914,714 A | 6/1999 | Brown | 345/339 |
| 5,917,491 A | 6/1999 | Bauersfeld | 345/810 |
| 5,933,142 A | 8/1999 | LaStrange et al. | 414/744.5 |
| 5,949,419 A | 9/1999 | Domine et al. | 345/349 |
| 5,963,952 A | 10/1999 | Smith | 707/102 |
| 5,964,836 A | 10/1999 | Rowe | 709/221 |
| 5,974,446 A | 10/1999 | Sonnenreich et al. | 709/204 |
| 5,999,179 A | 12/1999 | Kekic et al. | 345/349 |
| 5,999,972 A | 12/1999 | Gish | 709/219 |
| 5,999,973 A | 12/1999 | Glitho et al. | 709/223 |
| 6,000,832 A | 12/1999 | Franklin et al. | 700/232 |
| 6,006,034 A * | 12/1999 | Heath et al. | 717/170 |
| 6,009,459 A | 12/1999 | Belfiore et al. | 709/203 |
| 6,020,884 A | 2/2000 | MacNaughton et al. | 345/747 |
| 6,025,836 A | 2/2000 | McBride | 345/326 |
| 6,026,435 A | 2/2000 | Enomoto et al. | 709/217 |
| 6,034,683 A | 3/2000 | Mansour et al. | 345/764 |
| 6,041,360 A | 3/2000 | Himmel et al. | |
| 6,057,836 A | 5/2000 | Kavalam et al. | 345/334 |
| 6,061,695 A | 5/2000 | Slivka et al. | 715/513 |
| 6,072,486 A | 6/2000 | Sheldon et al. | 345/835 |
| 6,101,486 A | 8/2000 | Roberts et al. | 705/27 |
| 6,112,240 A | 8/2000 | Pogue et al. | |
| 6,119,098 A | 9/2000 | Guyot et al. | 705/14 |
| 6,125,352 A | 9/2000 | Franklin et al. | |
| 6,141,010 A * | 10/2000 | Hoyle | 345/854 |
| 6,175,869 B1 | 1/2001 | Ahuja et al. | |
| 6,185,600 B1 | 2/2001 | Spence et al. | |
| 6,188,995 B1 | 2/2001 | Garst et al. | 705/59 |
| 6,208,995 B1 | 3/2001 | Himmel et al. | 707/104 |
| 6,216,153 B1 | 4/2001 | Vortriede | 709/203 |
| 6,226,655 B1 | 5/2001 | Borman et al. | |
| 6,226,752 B1 | 5/2001 | Gupta et al. | |
| 6,232,972 B1 | 5/2001 | Arcuri et al. | 345/815 |
| 6,256,668 B1 * | 7/2001 | Slivka et al. | 709/220 |
| 6,262,731 B1 | 7/2001 | Hasegawa | 345/764 |
| 6,266,058 B1 | 7/2001 | Meyer | 345/733 |
| 6,282,548 B1 * | 8/2001 | Burner et al. | 707/104.1 |
| 6,286,001 B1 | 9/2001 | Walker et al. | |
| 6,292,185 B1 | 9/2001 | Ko et al. | 345/334 |
| 6,314,451 B1 * | 11/2001 | Landsman et al. | 709/203 |
| 6,360,255 B1 * | 3/2002 | McCormack et al. | 709/221 |
| 6,373,507 B1 | 4/2002 | Camara et al. | 345/825 |
| 6,385,619 B1 | 5/2002 | Eichstaedt et al. | |
| 6,407,754 B1 | 6/2002 | Hetherington et al. | |
| 6,433,800 B1 | 8/2002 | Holtz | 345/835 |
| 6,434,563 B1 | 8/2002 | Pasquali et al. | |
| 6,460,058 B2 | 10/2002 | Kopolu et al. | 345/738 |
| 6,469,713 B2 * | 10/2002 | Hetherington et al. | 345/740 |
| 6,476,833 B1 | 11/2002 | Moshfeghi | |
| 6,483,525 B1 | 11/2002 | Tange | 345/765 |
| 6,486,892 B1 * | 11/2002 | Stern | 345/760 |
| 6,490,602 B1 | 12/2002 | Kraemer | |
| 6,493,000 B1 | 12/2002 | Wynn et al. | 345/733 |
| 6,496,203 B1 | 12/2002 | Beaumont et al. | 345/762 |
| 6,496,936 B1 | 12/2002 | French et al. | |
| 6,505,238 B1 | 1/2003 | Tran | 709/208 |
| 6,542,897 B2 | 4/2003 | Lee | 707/102 |
| 6,549,217 B1 | 4/2003 | De Greef et al. | 345/745 |
| 6,584,505 B1 | 6/2003 | Howard et al. | |
| 6,624,831 B1 | 9/2003 | Shahine et al. | |
| 6,651,217 B1 | 11/2003 | Kennedy et al. | |
| 6,686,938 B1 | 2/2004 | Jobs et al. | |
| 6,704,031 B1 | 3/2004 | Kimball et al. | |
| 6,748,367 B1 | 6/2004 | Lee | |
| 6,784,900 B1 * | 8/2004 | Dobronsky et al. | 345/744 |
| 6,789,201 B2 | 9/2004 | Barton et al. | |
| 6,819,343 B1 | 11/2004 | Sobeski et al. | |
| 6,851,060 B1 | 2/2005 | Shrader | |
| 6,865,680 B1 | 3/2005 | Wu et al. | |
| 6,868,394 B1 | 3/2005 | Mele | |
| 6,873,974 B1 | 3/2005 | Schutzer | |
| 2001/0001147 A1 | 5/2001 | Hutchison et al. | |
| 2001/0035885 A1 | 11/2001 | Iron et al. | 345/855 |
| 2002/0018078 A1 | 2/2002 | Khan et al. | |
| 2002/0057299 A1 | 5/2002 | Oren et al. | 345/825 |
| 2002/0062342 A1 | 5/2002 | Sidles | |
| 2002/0070963 A1 | 6/2002 | Odero et al. | |
| 2002/0070969 A1 | 6/2002 | Barksdale et al. | |
| 2002/0075326 A1 | 6/2002 | Allen | 345/853 |
| 2002/0077978 A1 | 6/2002 | O'Leary et al. | 705/40 |
| 2002/0078095 A1 | 6/2002 | Culham | 715/516 |
| 2002/0089549 A1 | 7/2002 | Munro et al. | 345/835 |
| 2002/0097277 A1 | 7/2002 | Pitroda | 345/854 |
| 2002/0149615 A1 | 10/2002 | Rajarajan et al. | 345/738 |
| 2002/0149618 A1 | 10/2002 | Estrada et al. | 345/760 |
| 2002/0154159 A1 | 10/2002 | Day et al. | 345/738 |
| 2002/0158912 A1 | 10/2002 | O'Rouke | 345/810 |
| 2002/0163544 A1 | 11/2002 | Baker et al. | 345/835 |
| 2002/0163545 A1 | 11/2002 | Hii | 345/838 |
| 2002/0186239 A1 | 12/2002 | Komuro | 345/738 |
| 2002/0186249 A1 | 12/2002 | Lu et al. | 345/781 |
| 2002/0186255 A1 | 12/2002 | Shafron et al. | 345/810 |
| 2002/0186256 A1 | 12/2002 | Hong | 345/817 |
| 2003/0009768 A1 | 1/2003 | Moir | 725/112 |
| 2003/0011641 A1 | 1/2003 | Totman et al. | 345/810 |
| 2003/0028764 A1 | 2/2003 | Campbell | 713/156 |
| 2003/0067481 A1 | 4/2003 | Chedgey et al. | 345/738 |
| 2003/0080995 A1 | 5/2003 | Tenenbaum et al. | 345/738 |
| 2003/0085916 A1 | 5/2003 | Thiry et al. | 345/738 |
| 2003/0085927 A1 | 5/2003 | Muller | 345/810 |
| 2003/0112271 A1 | 6/2003 | Batalden et al. | 345/744 |
| 2003/0112280 A1 | 6/2003 | Driskell | 345/835 |
| 2003/0128233 A1 | 7/2003 | Kasriel | 345/738 |
| 2003/0131106 A1 | 7/2003 | Kasriel | |
| 2003/0202009 A1 | 10/2003 | Kasriel | |
| 2004/0061720 A1 | 4/2004 | Weber | |
| 2004/0125130 A1 | 7/2004 | Flamini et al. | |
| 2004/0174396 A1 | 9/2004 | Jobs et al. | |
| 2004/0186775 A1 | 9/2004 | Margiloff et al. | |
| 2004/0243520 A1 | 12/2004 | Bishop et. | |
| 2005/0039141 A1 | 2/2005 | Burke et al. | |
| 2005/0039144 A1 | 2/2005 | Wada et al. | |
| 2005/0198220 A1 | 9/2005 | Wada et al. | |

FOREIGN PATENT DOCUMENTS

| | | |
|---|---|---|
| WO | WO 00/31657 A2 | 6/2000 |
| WO | WO 01/39046 A1 | 5/2001 |
| WO | WO 01/67285 A2 | 9/2001 |
| WO | WO 01/95104 A1 | 12/2001 |
| WO | WO 03/038554 A2 | 5/2003 |
| WO | WO 03/038640 A1 | 5/2003 |
| WO | WO 2005/017670 A2 | 2/2005 |
| WO | WO 2005/019983 A2 | 3/2005 |
| WO | WO 2005/043355 A2 | 5/2005 |

OTHER PUBLICATIONS

Using Microsoft Internet Explorer 4. Eric Ladd and Jim O'Donnell. Que Corporation. 1997. pp. 42 and 43.

Trupin, "The Visual Programmer puts Active X Document Objects Through Their Paces", Microsoft Systems Journal, v11, n6,. p. 55(16), Jun. 1996.

"Client/Server and Host Application Development Tools", DBMS, v9, n6, p. 27(10), Jun. 15, 1996.

Childers, "Delphi Client/Server Suite", PC Magazine, v15, n1, p. 207(3), Sep. 10, 1996.

Persky, "HTML goes WYSIWYG: Two Mac-based Editors", LAN Magazine, v12, n3, p. 121(5), Mar. 1997.

Evans, "Extend Client/Server Apps to the Web", Data Based Advisor, v15, n3, p. 52(5), Mar. 1997.

Finn, "Add Control to your Intranet", Databased Web Advisor, v15, n8, p. 56(3), Aug. 1997.

Wong, "Meeting on the Internet in 10 Minutes", Network, v12, n12, p. 131(4), Nov. 1997.
Faison, "The New HTML Help System Extends Online Help From the Desktop to the Web", Microsoft Systems Journal, v13, n1, p. 55(14), Jan. 1998.
Alwang, "Meeting of the Minds", PC Magazine, v17, n4, p. 179(10), Feb. 24, 1998.
Walter, "Acrobat 4: Adobe's Bid to Make it More than Just a Viewer", Seybold Report on Internet Publishing, 3, 7, NA(1), Mar. 1999.
"Alexa Accessorizes Browsers". Alex Lash. CNET News.com. Sep. 22, 1997. http://news.com.com/2100-1001-203484.html.
"As Go Surfers, So Goes Alexa". Wired News. Jul. 24, 1997. http://www.wired.com/news/technology/0,1282,5427,00.html.
"Alexa Archives the Internet". Bart Eisenberg. Copyright 1997. http://www.gihyo.co.jp/magazine/SD/pacific/SD_9711.html.
"A Must-See Browser Add-On". Jesse Berst. ZDNet AncorDesk. Sep. 16, 1998. http://www.zdnet.com/anchordesk/story/story_2543.html.
Mace, Thomas, "PowerBrowser", PC Magazine, vol. 15 , No. 5, p. 132(1), Mar. 12, 1996.
International Search Report for International Application No. PCT/US99/25332, Feb. 2, 2000.
International Search Report for International Application No. PCT/US02/34509, Oct. 28, 2003.
International Search Report for International Application No. PCT/US02/34510, Jan. 31, 2003.
Written Opinion for International Application No. PCT/US02/34510, Sep. 26, 2003.
International Search Report for International Application No. PCT/US01/16993, Oct. 25, 2001.
International Preliminary Examination Report for International Application No. PCT/US01/16993, Mar. 5, 2003.
"Band Objects", Microsoft Corporation, Copyright 1997.
"Browser Extensions", MSDN, Copyright 2004, http://msdn.microsoft.com/library/default.asp?url=/workshop/browser/ext/overview/overview.asp.
"Creating Custom Explorer Bars, Tool Bands, and Desk Bands", MSDN, Copyright 2004, http://msdn.microsoft.com/library/default.asp?url=/library/en-us/shellcc/platform/Shell/programmersguide/shell_adv/bands.asp.
"Developers Get Early IE 5", Wired News, Jun. 11, 1998, http://www.wired.com/news/print/0,1294,12936,00.html.
"Introduction", XUL Programmer's Reference Manual, Last Updated: Apr. 5, 2001, http://www.mozilla.org/xpfe/xulref/.
"Netscape 6 Preview Release 1", NT Compatible, Apr. 5, 2000, http://www.ntcompatible.com/story322.html.
"Plug-in-Guide", DevEdge Online Documentation, Jan. 1998, Chapter 1, http://developer.netscape.com/docs/manuals/communicator/plugin/index.htm.
"Subject: Add toolbar to IE4-taskbar", Google Groups, Jan. 26, 1999, http://groups.google.com/groups?hl=en&lr=&ie=UTF-8&oe=UTF-8&threadm=36ae2a57.3471779%40news.uni-stuttgart.de&rnum=9&prev=/groups%3Fhl%3Den%26lr%3D%26ie%3DUTF-8%26oe%3DUTF-8%26q%3Dtoolbar%2Bin%2Bie4.
"Subject: Adding Toolbar (Plugin) in Netscape Communicator", Google Groups, May 18, 2000, http://groups.google.com/groups?hl=en&lr=&ie=UTF-8&oe=UTF-8&threadm=8gp8t5%241ab1%40secnews.netscape.com&rnum=23&prev=/groups%3Fq%3Dcustom%2Btoolbars%2Bin%2Bnetscape%2B6%26start%3D20%26hl%3Den%26lr%3D%26ie%3DUTF-8%26oe%DUTF-8%26selm%3D8gp8t5%25241ab1%2540secnews.netscape.com%26rnum%3D23.
"Subject: Custom Toolbar for Netscape Browser", Google Groups, May 15, 2001, http://groups.google.com/groups?hl=en&lr=&ie=UTF-8&oe=UTF-8&threadm=3B0177FD.BE89042B%40univ.ox.ac.uk&rnum=2&prev=/groups%3Fhl%3Den%26lr%3D%26ie%3DUTF-8%26oe%3DUTF-8%26q%3Dcustom%2Bnetscape%2B6%2Btoolbar%2B-button%2B-personal.
"Subject: How the Hell ????", Google Groups, Jun. 6, 2000, http://groups.google.com/groups?hl=en&lr=&ie=UTF-8&oe=UTF-8&threadm=8hln7u%24fb53%40secnews.netscape.com&rnum=11&prev=/groups%3Fq%3Dadding%2Btoolbars%2Bin%2Bnetscape%2B6%26start%3D10%26hl%3Den%26lr%3D%26ie%3DUTF-8%26oe%3DUTF-8%26selm%3D8hln7u%2524fb53%2540secnews.netscape.com%26rnum%3D11.
"Subject: How to add toolbar like Yahoo companion in IE", Google Groups, Sep. 30, 1999, Messages 1-10, http://groups.google.com/groups?hl=en&lr=&ie=UTF-8&oe=UTF-8&threadm=OWImH%246C%24GA.227%40cppssbbsa02.microsoft.com&rnum=88&prev=/groups%3Fq%3Dtoolbar%2Bin%2Bie4%26hl%3Den%26lr%3D%26ie%3DUTF-8%26oe%3DUTF-8%26start%3D80%26sa%3DN.
"Subject: How to add toolbar like Yahoo companion in IE", Google Groups, Sep. 30, 1999, Messages 11-14, http://groups.google.com/groups?hl=en&lr=&ie=UTF-8&oe=UTF-8&threadm=7tdbfa%247j9%241%40nnrp1.deja.com&rnum=2&prev=/groups%3Fhl%3Den%26ie%3DUTF-8%26oe%3DUTF-8%26q%3Dtool%2Bband%2Bin%2Bie4%26spell%3D1.
"Subject: IE4 Band Objects", Google Groups, Mar. 22, 1998, http://groups.google.com/groups?hl=en&lr=&ie=UTF-8&oe=UTF-8&threadm=3524f417.0%40news1.cityweb.de&rnum=1&prev=/groups%3Fhl%3Den%26lr%3D%26ie%3DUTF-8%26oe%3DUTF-8%26q%3D%2522communication%2Bbands%2522%2Bie4.
"Subject: Plugins for IE", Google Groups, Sep. 30, 2000, http://groups.google.com/groups?hl=en&lr=&ie=UTF-8&oe=UTF-8&threadm=Ojkp2jxLAHA.243%40cppssbbsa04&rnum=24&prev=/groups%3Fq%3Dplugin%2Bgroup:microsoft.public.inetexplorer.ie4.activex_contrl%26hl%3Den%26lr%3D%26ie%3DUTF-8%26oe%3DUTF-8%26group%3Dmicrosoft.public.inetexplorer.ie4.activex_contrl%26start%3D20%26sa%3DN.
"Subject: Toolbar like IE4", Google Groups, Apr. 23, 1998, http://groups.google.com/groups?hl=en&lr=&ie=UTF-8&oe=UTF-8&threadm=eyzHG4qb9GA.136%40uppssnewspub05.moswest.msn.net&rnum=6&prev=/groups%3Fhl%3Den%26lr%3D%26ie%3DUTF-8%26oe%3DUTF-8%26q%3Dtoolbar%2Bin%2Bie4.
"Subject: Whats the deal with Yahoo Companion? Standard plugin API or not?", Google Groups, Jan. 12, 2000, http://groups.google.com/groups?hl=en&lr=&ie=UTF-8&oe=UTF-8&threadm=387D225C.E3796E7C%40sympatico.ca&rnum=2&prev=/groups%3Fhl%3Den%26lr%3D%26ie%3DUTF-8%26oe%3DUTF-8%26q%3Dcustom%2Btoolbar%26btnG%3DGoogle%2BSearch%26meta%3Dgroup%253Dnetscape.devs-plugins.
Flanagan, David, "Netscape 6.0 Released", O'Reilly, Nov. 16, 2000, http://www.oreillynet.com/pub/a/oreilly/news/flanagan3_1100.html.
Galli, Marcio, "The DevEdge RSS-News Ticker Toolbar", Netscape DevEdge, Jul. 14, 2003, http://devedge.netscape.com/viewsource/2003/rss-toolbar-ticker/.
Jimmy, "Netscape 6.0 Preview Release 2 Review—Good Software, Bad Timing", Jimmy's World, Aug. 9, 2000, http://www.jimmysworld.org/opinions/netscape-6.0-pr2.html.
Mann, Alex and Hecht Kevin, "DevEdge Newsgroup FAQ: Client Technical", DevEdge Online Archive, Last Updated: Dec. 15, 1998, http://developer.netscape.com/support/faq/schampions/client_tech.html.
Mendelson, Edward, "Wake Up Your Web Site", PC Magazine, vol. 17, No. 11, p. 60(2), Jun. 9, 1998.
Roberts, Scott, "Programming Microsoft Internet Explorer 5", Jul. 1999, pp. 3-16, 383-423, 461-475, Microsoft Press, USA.
Summers, Jason, "Plug-ins Newsgroup FAQ: Plug-ins", DevEdge Online Archive, Last Updated: May 26, 1999, http://developer.netscape.com/support/faqs/plugins/general.html.
Alexa, Alexa Toolbar Version 1.4.1, Copyright 1998, [Note: Setup File Available on Enclosed CD in Folder Entitled "Alexa Setup," also available at http://ftp3.ru.freebsd.org/pub/pc/windows/WinSock/IE/ at hyperlink alexaSetup14m.exe.
International Preliminary Examination Report for International Application No. PCT/US99/25332, Jul. 29, 2002.
International Preliminary Examination Report for International Application No. PCT/US02/34509, May 13, 2004.
International Preliminary Examination Report for International Application No. PCT/US02/34510, Aug. 16, 2004.
International Search Report for International Application No. PCT/US04/24397, Oct. 31, 2005 (WO 2005/019983 A3).

Written Opinion for International Application No. PCT/US04/24397, Oct. 31, 2005.
International Preliminary Examination Report for International Application No. PCT/US2004/024397, Feb. 13, 2006.

Hauser, "Generic Extensions of WWW Browsers", First USENIX Workshop on Electronic Commerce; Aug. 10, 1995; pp. 147-154.

* cited by examiner

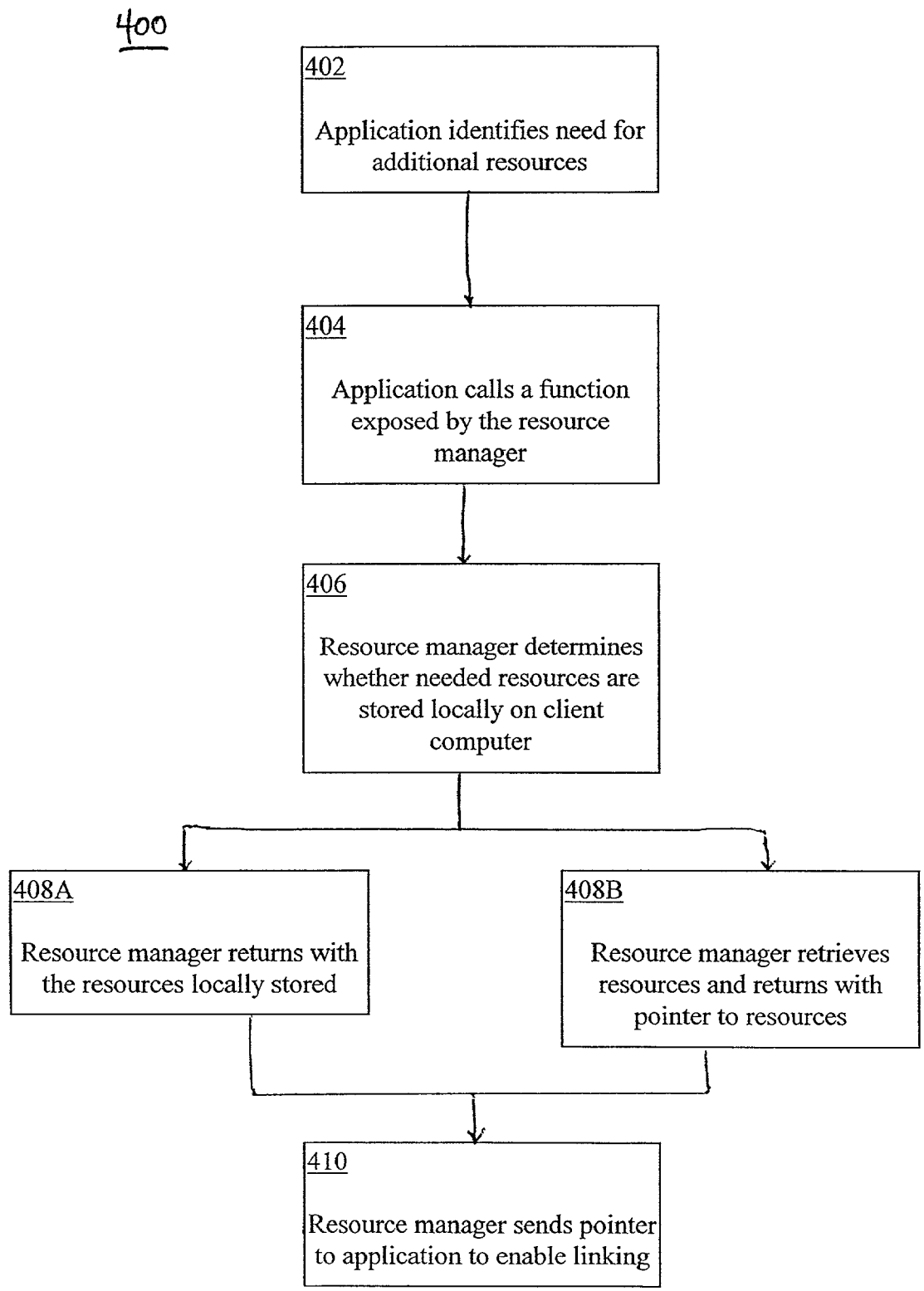

502
User registered with application provider logs onto the server system through the Application provider's web site

↓

504
Server system ascertains user's preference setting

↓

506
Preference settings identified by a group ID are downloaded to the client computer

↓

508
Resource manager determines the availability of the resources associated with preference setting → NO → 510 Application links to stored copy of resource

↓ YES

512
Resource manager prompted to retrieve the resource from the server system

METHOD AND SYSTEM FOR MANAGING THE RESOURCES OF A TOOLBAR APPLICATION PROGRAM

CROSS-REFERENCE TO RELATED APPLICATIONS

This application is a continuation-in-part of U.S. application Ser. No. 09/429,585, filed on Oct. 28, 1999, (now U.S. Pat. No. 7,107,548), published on Aug. 26, 2004 as U.S. Published Application Ser. No. 20040165007. The entire disclosure of U.S. Published Application Ser. No. 20040165007 is incorporated herein by reference.

FIELD OF THE INVENTION

The present invention is directed to the field of software systems and applications, and, more particularly, to a method and system for dynamically managing the resources of at least one application stored on a computer and for permitting the customization of the operation and interface of at least one application in response to a change in user preference.

BACKGROUND OF THE INVENTION

Generally speaking, software applications consist of many files, all of which interoperate to provide the overall functionality of, and the user interface to, the application. Applications can be executables, scripts, and/or libraries such as dynamic link libraries (DLLs), or any combination thereof, which may be provided with resources that support the application's functionality and interface features. At present, DLLs, which are libraries of executable code and/or data, are commonly used by programmers to provide one or more of the functions of an application. The application dynamically links to the DLLs, which are often distributed with the application. In some instances, DLLs may be shared among applications or made available by an operating system. Therefore, both the DLLs and the application code which is programmed to link to the DLLs must be present on the computer at runtime for the application to function properly.

As used herein, the term "resource" or "resources" is used in accordance with its ordinary meaning and generally refers to a library containing text strings and/or image data processed by an application, such as for example those needed to generate a portion of the user interface. The resources of an application may, for example, be encompassed in one or more DLLs, text files, executables, or data files of any type.

Increasingly, however, due to the emergence of global communication networks, such as the Internet and/or the World Wide Web (the "Web"), the global distribution of computer applications has increased markedly. Through electronic file transfer protocols, web-based application providers can distribute applications to users in many different countries. Undoubtedly, these applications will require updates and patches, which may require additional resources. Moreover, it is likely that users will have different preferences related to the operation of the application.

Currently, applications, such as executables, Active X Controls, and the like, are downloaded to a client computer where the application is processed. In many instances, however, the application accesses the Internet or other communication network to retrieve information or content, such as stock quotes, news, electronic mail, and the like. Such "web-based" applications have become popular for a variety of functions because they have the ability to extract and display information in real-time or near real-time from remote databases.

Users desiring such web-based applications commonly register with an on-line application/content provider and download the application to the user's computer, typically referred to as the client computer. During the registration process, the user may be asked to enter personal information or preferences so that the operation and interface of the application can be customized. For instance, users from different countries may have a preference for which language (i.e., English, German, French, etc.) the application utilizes to generate the graphical user interface (GUI) and to communicate with the user. Indeed, in many instances, a user may download a series of applications which may each have certain similar customizable aspects. Furthermore, these applications may utilize the same resources and may be amenable to similar updates.

The presently known methods and systems for managing such resources and for permitting the customization of the operation and interface of applications have shortcomings. For example, known programming methods cannot effectively update or patch existing resources or integrate new resources not initially incorporated into an application without having to restart the application. Therefore, these methods and systems fail to satisfactorily permit the customization of an application to different user preferences. In addition, known methods and systems do not efficiently permit an application/content provider to distribute a single international application.

One known method and system requires that the resources for customizing the application be built (or hard-coded) into the application itself and distributed with each copy. This method, however, undesirably increases the size of the application and is unable to process resources that were not incorporated into the application at the time of download and installation. Because these web-based applications are generally downloaded from remote servers using file transfer protocols (FTP), increased file size adversely affects the file transfer performance, and this increased time factor may be a deterrent to a user downloading it, in addition to increasing necessary network overhead.

Another known method requires the development of separate versions of the application with support for each particular preference. For instance, in the case of language preferences, a developer could provide a separate version for every region to which the application would be distributed. Maintaining numerous versions, however, is time consuming and can result in increased costs to the developer and users.

Yet another known solution would be to build client-side scripts or server-side software applications, which run within the user's Internet browser. In use, only the version of the scripted application that corresponds to the user's particular preference would be downloaded. A change of preference would prompt the download of a separate version of the scripted application. Such scripted applications, however, such as, for example, JavaScript™, are limited by the functionality and extensibility of the scripting language, which often does not have the same speed of operation and access to system functions as full application languages. The availability of bandwidth to users can also adversely affect the performance of scripted or server-side applications, because the scripted application must be downloaded to the client computer each time a preference change is requested.

Lastly, server-side applications have limited scalability due to the limits on physical server space and memory and processing power.

There is thus a desire and unmet need to provide a method and system for more efficiently managing the resources of one or more applications. A further desirable and unmet need is to permit the customization of application resources that operates at runtime and that can be efficiently maintained. Furthermore, it is a desirable and unmet need to provide a system and method for permitting updates, patches and further customizable options to be integrated into the application resources, while keeping the application streamlined and preserving its efficiency.

SUMMARY OF THE INVENTION

The present invention is directed to a system and method which overcomes shortcomings in the prior art. In particular, a system and method is provided for dynamically managing the resources of an application, e.g. a toolbar application, and for customizing the operation and interface of a web-based application in response to a change in user preference.

According to the present invention, a resource manager is programmed to identify resources by unique resource identifiers, and in response to a request for such resources, to retrieve those resources from a server if the resources are not stored locally on the client computer. Once retrieved, the resource manager passes the resources to the application. In one preferred embodiment, referred to generally as the "pull" embodiment, the application recognizes the need to process a resource and request that resource or group of resources from the resource manager, which in turn determines the availability of the resource and retrieves it from the server system if it is locally unavailable. In another preferred embodiment, referred to generally as the "push" embodiment, the server system receives a preference change request and the resource manager, with the next communication with the server system, receives the preference parameters associated with the preference change. The resource manager then looks in its map of resource identifiers to determine whether the corresponding resources are locally stored. If one or more resources are not locally stored, the resource manager retrieves, from the server system, either the entire group of resources corresponding to the preference parameters or that particular missing resource. In the meantime, the resource manager passes the locally stored resources to the application. The resource manager then passes any resources retrieved from the server system to the application, as necessary.

As used herein, the term "application" generally refers to a software program which is substantially executed by a computer located on the client side of the client-server architecture. The term "web-based application" refers generally to applications that at least partially derive the data for operation from a remote server and/or are capable of receiving data from a remote server or other computing or storage device remote from the client, either at the server location or at one or more locations in the network to which the client is connected. Such applications, e.g. a toolbar application, for the purposes of the present invention, may be coded in any programming language known in the art. In addition, the applications may be delivered to the client side in any manner known in the art, such as via file download, electronic mail, or any other file transfer protocols that use networks of interconnected devices to transfer data. Furthermore, such applications may be distributed on any art-recognized machine readable storage medium, such as a compact disc, floppy disc, tape, or the like.

The present invention utilizes a resource manager stored on a client computer to determine whether the resources necessary to process a particular aspect of an application are present on the client computer at the time of execution of the application. In use, when the subject application is first downloaded to the client computer, the resource manager is also downloaded and stored on the client computer. The resource manager may be an integral part of the application or may stand alone as its own library, such as an "in-process" component object model ("COM") server (DLL) or an "out of process" COM server (.exe). In each case, however, the downloaded application is programmed to interoperate with the resource manager to determine whether the necessary resources for its operation have also been downloaded or otherwise made present on the client computer.

In general, according to the present invention, the resource manager contains a library of ID maps associating a resource to a unique resource identifier. The resource identifier may be, for example, an alphanumeric code containing a resource group ID, resource ID, date ID, version ID, and the like, or any combination thereof.

In one preferred embodiment, a server system receives a request to change a preference from a client computer through a network. Based upon the request, the server system determines the resources necessary to accommodate the request. Next, the server system communicates the preference parameters to the resource manager through the network. Alternatively, the resource manager with the next communication with the server system pulls the preference parameters associated with the preference change from the server system. The resource manager uses the preference parameters to determine whether the resources associated with the group identifier are stored on the client computer. If each resource of the group of resources are found on the client computer, the resource manager loads the resources into the processing memory of the client computer and passes the resources to the application. If one or more resource is not found on the client system, the resource manager retrieves either the entire group of resources or that particular resource from the server system using the resource's unique identifier.

Alternatively, the application can be programmed to recognize the need for a resource or group of resources and notify the resource manager to retrieve the resources. In this embodiment, the application can identify the unique group IDs associated with a particular language, region, or preference (e.g., language, region, etc.), or the unique resource ID, if only one of the group is needed.

An advantage of the present invention is that as new versions of the resources are created or new regions are supported, the application provider can distribute these additional resources to the resource manager as needed. For example, an application provider providing additional resources for a web-based application may make the additional resources available for download to the client computer. Once received by the resource manager, the resources are preferably stored either in the memory space of the manager or the memory space of the application on the client computer. However, the resources can be stored on the server system and loaded temporarily into the memory of the client computer as needed.

The present invention provides advantages to both the application user and the application provider. For the application provider, new resources or versions of the resources can be incorporated into an existing application without the need to release an entirely new version of the application. In addition, in the case of web-based applications, the manager can be alerted by a server system that new resources are available, thereby causing the new resources to be downloaded to the client computer without interrupting the user's experience. Because the application is either notified of additional resources or knows to ask the manager when additional resources are needed, the application can be customized seamlessly at runtime without re-execution of the application.

Since the resources for an application are essentially libraries of data, the resources are often associated with a customizable feature of the application. The manager advantageously permits an application provider to store a set of resources pertaining to particular customizable options on a remote server. Using the manager, the application provider can permit a user to select certain customizable preference settings.

In operation, a user may request to change a particular preference setting, such as, for example, the language used to generate the user interface. In response to the request, the application will determine whether or not the resource that is needed to generate the user interface in the new language has been downloaded to the client computer, as described above. If it has not, depending upon the embodiment utilized, the application will either notify the resource manager that additional resources are needed (i.e., call an exposed function of the resource manager) or await notification from the resource manager. The resource manager in turn, in a web-enabled application example, retrieves the necessary resources from a remote server.

In addition, the manager permits additional users of the same client computer to customize the application and the user interface to their particular preferences as will be further illustrated in the detailed description in connection with the drawing figures. Furthermore, because the application is streamlined, due to the lack of a need to hard-code all of the resources necessary to provide customization capabilities, the user saves download time and disk space and avoids the need to re-start the application.

In another embodiment of the present invention, the resource manager manages the resources for a plurality of applications stored on the client computer. In accordance with this embodiment, a method of managing the resources for a plurality of applications generally comprises mapping an identifier to a resource, receiving into a server system a request to customize an application, communicating the identifier to a resource manager stored on a client computer, determining whether the resource associated to the identifier is stored on the client computer, and retrieving the resource if the resource is not stored on the client computer. Next, each application that shares the resource is notified of the resource's availability, i.e., its accessibility to be linked to by a particular application.

In addition, a client-server system for managing the resources of one or more applications generally comprises a server system having a storage device, the storage device having stored thereon a plurality of resources for use with one or more applications, and a client computer having stored thereon the one or more applications and a manager. The client computer is inter-operative with the manager so as to register the application modules with the manager when the application module is downloaded to the client computer.

Other objects and features of the present invention will become apparent from the following detailed description, considered in conjunction with the accompanying drawing figures. It is to be understood, however, that the drawings are designed solely for the purpose of illustration and not as a definition of the limits of the invention, for which reference should be made to the appended claims.

BRIEF DESCRIPTION OF THE DRAWINGS

In the drawing figures, which are merely illustrative, and wherein like reference characters denote similar elements throughout the several views:

FIG. 4 is a flow diagram of a method of seamlessly integrating an application update in accordance with a preferred embodiment of the present invention;

FIG. 5 is a flow diagram of a method of customizing the operation and interface of an application in accordance with a preferred embodiment of the present invention.

DETAILED DESCRIPTION OF THE PREFERRED EMBODIMENTS

According to the present invention a system and method for managing the resources for one or more applications is provided. In operation, the present invention permits the resources of one or more applications to be updated, supplemented, or patched. Furthermore, the present invention advantageously permits additional resources to be downloaded and accessed by one or more applications, thereby permitting the internationalization of a suite of applications.

With reference generally to FIGS. 1–10, a resource manager 75 for use with the present invention is provided along with, prior to, or after delivery of the operating code of an application 70. Preferably, when the application 70 is loaded or downloaded to a client computer 50, the resource manager 75 is also loaded onto the client computer 50. In the alternative, the resource manager 75 can be hardcoded into the application 70 as an integral part. Thus, as will be described further, the manager 75 can be a standalone program or can be integrated within the application 70. As previously defined, the term "resource" generally refers to a library containing the text strings and/or image data processed an application 70, for example, to generate the user interface of an application. In use, the application links to the resource 72 either statically or dynamically (as needed), to process the application 70.

Figure 1:
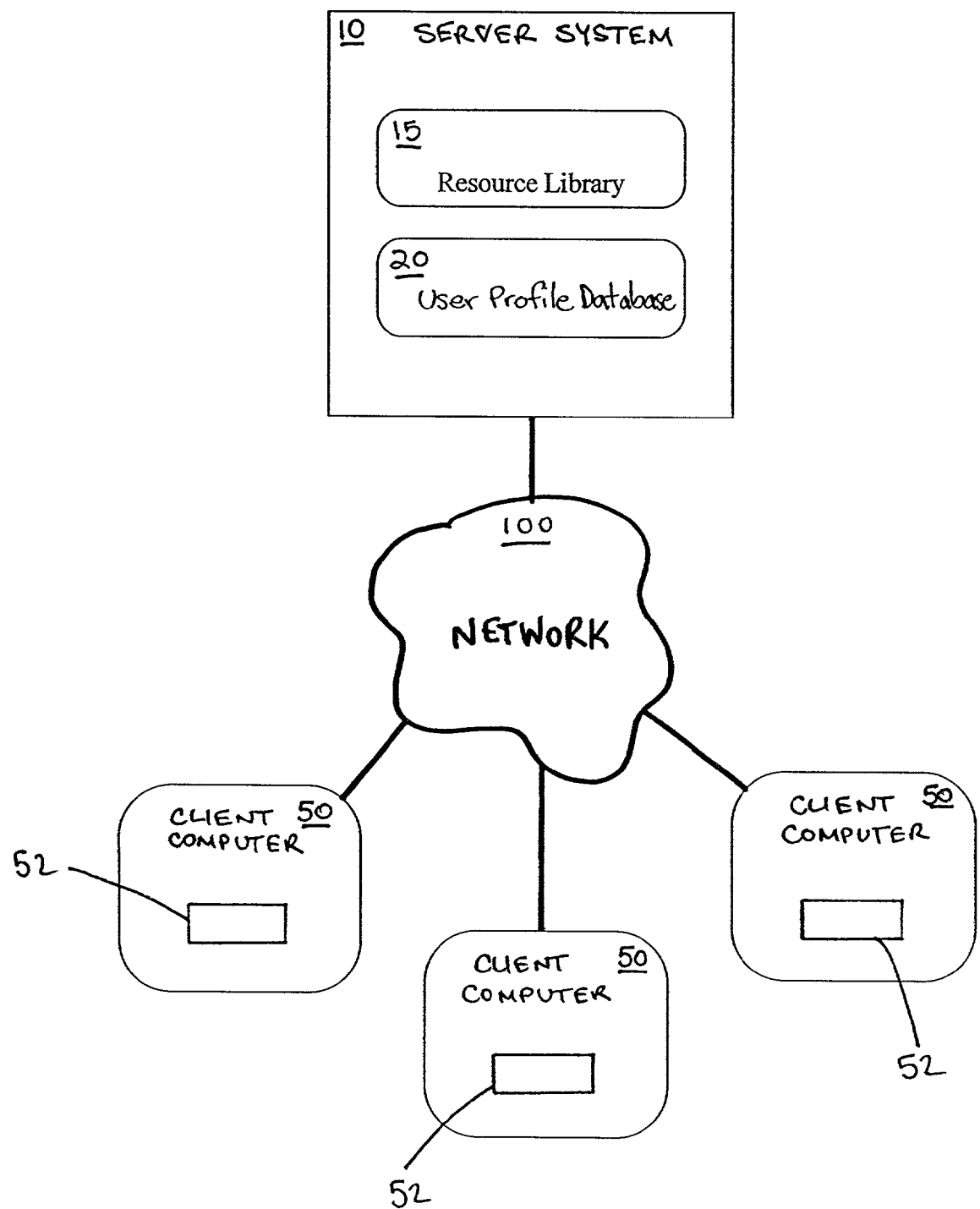
FIG. 1 is a schematic overview of the system architecture of a preferred embodiment of the present invention.

Referring now to FIG. 1, an overview of a preferred embodiment of the system architecture for use with the present invention is shown. A server system 10 of an application/content provider is connected to a global communications network 100 via a generally known network interface. A plurality of client computers 50 are interconnected to the server system 10 through the network 100.

The server system 10 includes one or more storage devices 15, 20 for storing the content and data that is distributed through the network to the client computers 50. The server system 10 also includes a processor, such as the Intel Pentium III Xeon processor, memory (RAM, ROM), clocks, and other components commonly included with server systems known in the art (not shown). The storage device 15, 20 is any machine-readable storage medium now known or that will be known in the art, such as by way of non-limiting example, a hard disk, optical drive, or tape drive. The particular architecture of server system 10 is not critical to the invention and, therefore, server system 10 is not depicted in detail. The network 100 is preferably the Internet; although one skilled in the art will recognize that the network may be any communications network now known or that will be known that is capable of transmitting data, such as, for example, an intranet, local area network, wide area network, or other network using point-to-point protocols (PPP), wireless application protocols (WAP), and the like.

Figure 2:
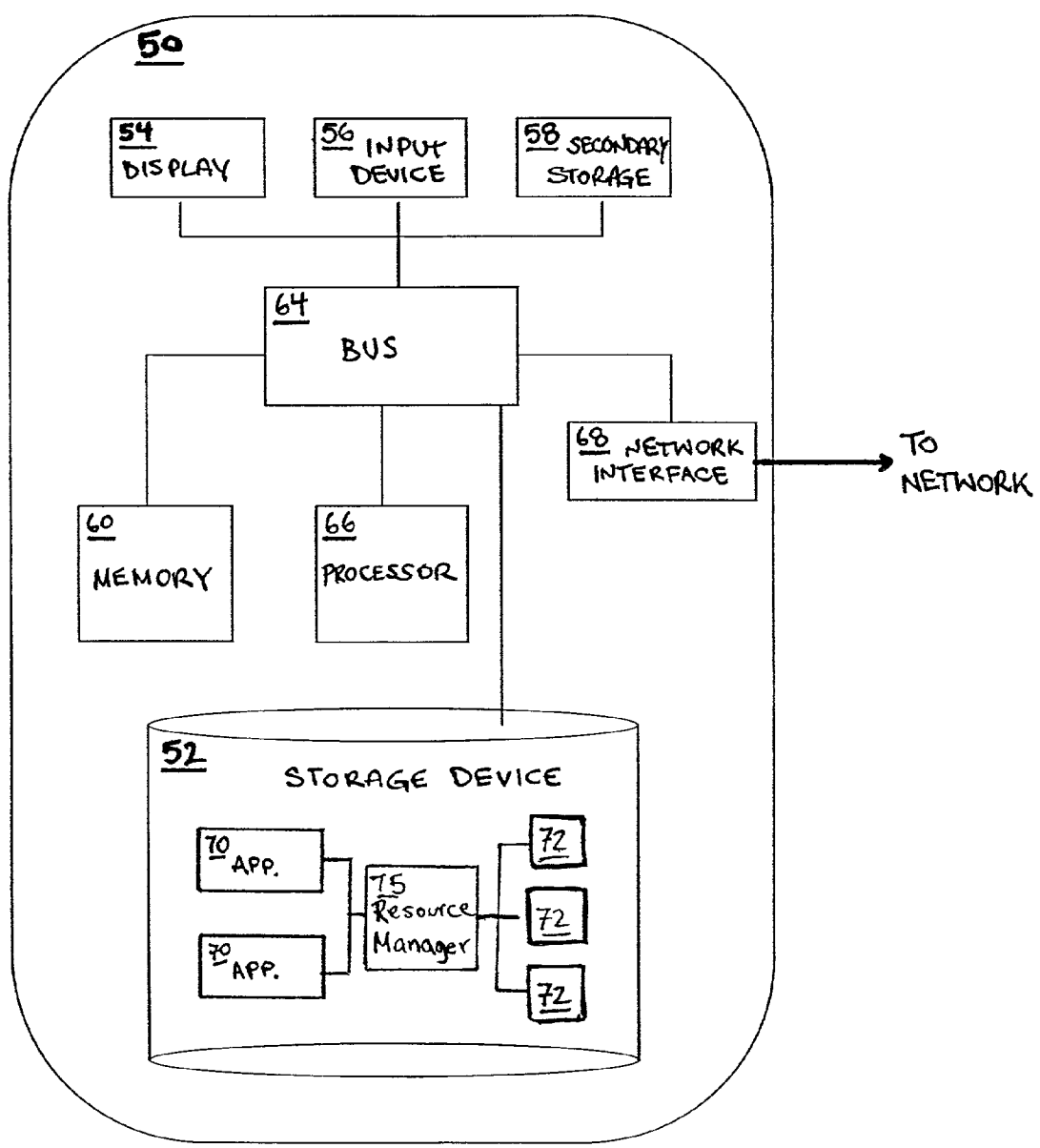
FIG. 2 is a schematic block diagram of a client computer connected to a network and upon which the present invention may be implemented.

With further reference to FIG. 2, a schematic of a client computer 50 for use with the present invention is shown. The client computers 50 are any type of personal or network computer having an operating system and, preferably, running a browser such as Microsoft Internet Explorer or Netscape Navigator. Client computers 50 generally access the network 100 to download an application 70 from the server system 10. The application 70 is then stored and processed on the client computer 50.

Client computer 50 includes an internal bus 64 that facilitates communication of data between and among the various components of the client computer 50 and that also facilitates communication between the client computer 50 and external devices and systems via the network interface 68. A processor 66 is coupled to the bus 64 to process data, including application programs, within the client computer 50. The client computer 50 also includes a main memory 60, such as, for example RAM or other equivalent dynamic memory storage, coupled to bus 64 for receiving and storing instructions communicated by the processor 66. Read-only memory (ROM) is also provided and coupled to the bus 64 to store static data and instructions for use by the processor.

Various input and output devices 54, 56, 58 are provided with the client computer 50, including, by way of non-limiting example, a display 54 (e.g., cathode ray tube (CRT), liquid crystal display (LCD), etc.), and an input device 56 (e.g., a keyboard, mouse, touch pad, or light pen). A second storage device 58 such as, for example, a magnetic disk drive and magnetic disk, a CD-ROM drive and CD-ROM, DVD, or other equivalent device, is coupled to the bus 68 for communication with the processor 66, main memory 60 and network interface 68. The specific hardware combination/configuration is not crucial to the instant invention, and may vary as a matter of design choice within the functional parameters taught herein.

Referring again to FIG. 1, a user (not shown) generally utilizes client computer 50 to access the network 100. Although, as set forth above, network 100 is not limited to the Internet, the present invention will be described in connection with use of the World Wide Web or Internet. The client computer 50 connects to the network 100 via the network interface 65 over a transmission media such as, by way of non-limiting example, coaxial cable, copper wires, or fiber optical cables. Communication between the client computer 50 and the network 100 may also be via wireless, satellite, or cellular interface. The network interface 68 facilitates two-way communication between the client computer 50 and the server system 10 provided by the content/application provider (not shown).

Content and information is downloaded to the client computer 50 through network 100 using, for example, the hypertext transfer protocol (HTTP) in various known formats, such as, for example, HTML, DHTML, XML, scripting languages, and the like. A browser application is stored on the client computer 50 and is programmed to interpret the code downloaded from the server system 10, thereby producing a GUI with which the user can interact. By way of non-limiting example, applications 70 and related resources 72 are preferably downloaded using known hyper-text transfer protocols (HTTP). Once downloaded, the application 70 may be launched by the user or it may be self-extracting and self-executing. Resources 72 are stored on the client computer 50 as described below so as to be available to the application 70 when needed.

Figure 3:
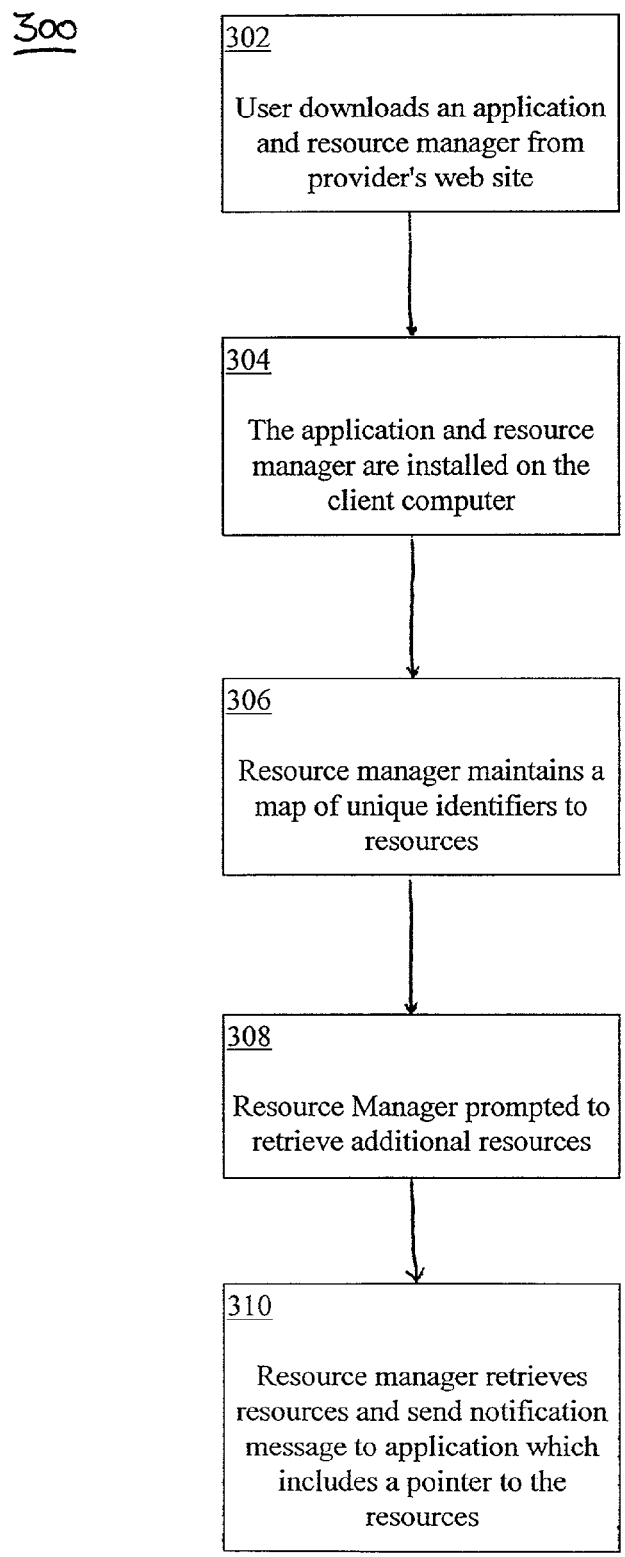
FIG. 3 is a flow diagram of a method of managing the resources of an application in accordance with a preferred embodiment of the present invention.

With reference now to FIG. 3, a method of managing the resources 72 of an application 70 is there depicted in accordance with an embodiment of the present invention, and designated generally as 300. At step 302, after the user has caused the client computer 50 to link to the server system 10 of the application provider through the network 100, the user downloads the application 70 from the provider's server system 10. The application 70 is downloaded along with a resource manager 75, which is either provided as an integral part of the application 70 or as a stand-alone component. Once the download is completed, the application 70 and resource manager 75 can be installed, in a step 304, either by manually launching an installation program or by automatically launching a self-extracting file. The resource manager 75 is preferably stored locally on the client computer 50 in a memory space reserved for the operation of the resource manager 75. Resource manager 75 is preferably a dynamic library, such as an in-process COM server (e.g., a DLL) or an out-of-process COM server (e.g., a EXE). As previously discussed, the resource manager 75 can also be integrated within the application 70. In either case, resource manager 75 is programmed to identify, map and store a unique identifier for each resource 72 that is downloaded to the client computer 50 and related to application 70. In short, the resource manager 75 maintains a map of the associations of unique identifiers to resources 72.

As described above, in a preferred embodiment, at step 306, the resource manager 75 maintains a map of unique identifiers for each resource 72 that is downloaded with the application 70. In this way, the resource manager 75 can identify all of the resources 72 available to the application 70 at any given time. Upon being prompted, as will be further described, in a step 308, the resource manager 75, at step 310, retrieves the resources 72 and send a notification message to application 70, which includes a pointer to the resources 72, so as to enable application 70 to link to resources 72 as needed.

The unique identifier can be formatted as a unique series of characters, numbers or other data readable by the manager 75, such as, for example a software identifier and unique number combination. By way of non-limiting example, the unique identifiers may include varying levels of identifiers such as regional identifiers, group identifiers, and individual resource identifiers. Furthermore, the unique identifiers can include date and/or version identifiers such that the resource manager 75 can identify updated versions of resources 72. Alternatively, a single unique identifier can be assigned to each resource 72, which includes the codes necessary to identify the resource 72 with a particular region, language or group.

As used herein, the term "request" refers to a message or data transmitted between the client computer 50 through network 100 to server system 10, so as to enable the communication of resource identifiers and other types of communication.

The process of dynamically linking to the resources will now be described. In one preferred embodiment, upon retrieving the resources 72 as previously described, resources manager 75 calls a function exposed by application 70 and passes the resources 72 to application 70 as an argument. One skilled in the art will recognize that the linking procedure may be performed in many ways, including without limitation, the use of pointers, addresses, and the like.

As such, the application 70 is programmed to receive the notification from the resource manager 75 that additional resources 72 are available. If the conditions are such that the additional resource 72 is needed (i.e., the resource is needed to generate a user interface associated with a particular preference setting), the application 70 will link, as describe above, to the resource 72 so that the text-strings and image data contained within the resource 72 can be accessed and used by the application 70. Since the download and notification procedure is generally relatively short, the resource 72 will be available for access substantially immediately after it is downloaded. In this way, the present invention permits the application 70 to be updated or customized substantially in real time. Furthermore, because the application 70 is programmed to receive the notification from the resource manager 75 (or check with the manager for new resources 72 when the application 70 is prompted for that resource 72), there is no need to re-execute the application 70 upon the availability of new resources 72. The resources 72 therefore can become available to the application 70 during its execution.

Referring now to FIG. 4, in yet another preferred embodiment, the application 70 calls a function exposed by the resource manager 75 to retrieve the resources 72, upon the retrieval of which, the resource manager 75 returns the resources 72 to the application 70. The application 70 is programmed to identify a need for resources 72 and check with the resource manager 75 each time it is necessary to link to a resource 72, as in step 402. In step 404, the application 70 calls a function exposed by the resource manager 75. If the resource manager 75 determines that the resource is stored on the client computer 50, in a step 406, the resource manager 75 passes the resource 72 to application 70, in a step 408A. If, however, the resource 72 has not been found, the resource 72 is retrieved or downloaded from the server system 10, in step 408B. In both instances, the resource manager 75 returns a pointer to application 70 to enable linking to resources 72.

Because querying the resource manager 75 each time a resource 72 is needed can slow the procedure, it is preferable to pass newly available resources 72 to the application 70 and to store a copy of the resource 72 in the memory space of the application 70. In this way, the application 70 can process instructions to link to available resources 72 without waiting for a response from the resource manager 75.

However, one skilled in the art will recognize that the resources 72 may be stored on a server system 10 and downloaded to client computer 50 only as needed. As such, resources 72 would only be temporarily loaded into the processing memory space of client computer 50 when needed to generate a user interface.

As will be shown and described with reference to the various embodiments described herein, the method of FIG. 3 may be adapted to many different applications in accordance with the present invention.

For instance, a preferred embodiment of the present invention may be adapted to a method of downloading an updated resource. By way of example, during operation, the resource manager 75 can be notified by the application provider of an updated resource 72, which requires additional resources 72. In the alternative, the user can request to download the updated resource 72 from the server system 10. The resource manager 75 determines which version of the resource 72 is stored locally on client computer 50 by comparing the unique identifiers of the resources 72, which may include a date or version ID. Once retrieved, the resource 72 will be linked to as described above.

Referring to FIG. 5, a method of customizing the operation or interface of an application 70 is there described in accordance with an embodiment of the present invention, and generally designated as 500. At step 502, a user, who has previously registered with the application provider, logs into the application provider's site using a password or other unique identifier that is recognizable by the server system 10. During the aforementioned previous registration, the user may have been prompted by the application/content provider to input certain personal information and preference settings, such as by way of non-limiting example a language preference. This information is stored in a database on the server system 10. In step 504, the unique user identifier is used by the server system 10 to retrieve the preference settings or other such customizable information from the server database. In a step 506, an access code or a group ID associated with a group of resources 72 is communicated to the client computer 50 and identified by the resource manager 75.

At step 508, the resource manager 75 determines the availability of the resource 72 required to display the application interface in accordance with the user's registered preferences. If the resource 72 is available, in a step 510, the resource manager passes the resources to application 70 as described above, to enable application 70 to generate the customized functionality. If, however, the resource 72 is not yet available, the resources manager 75 retrieves the needed resource 72 from the server system 10, in a step 512.

Figure 9:
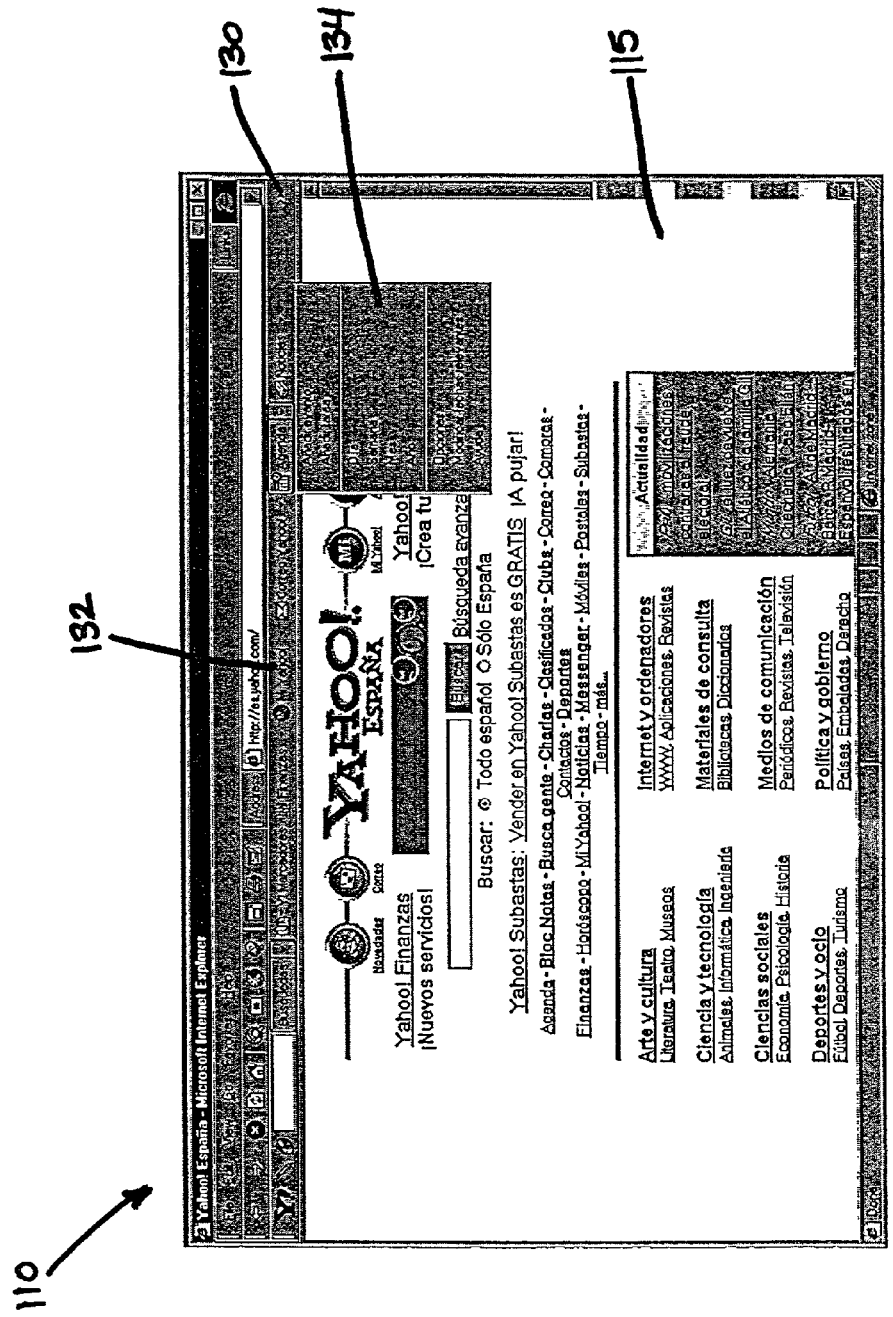

Such employment of the present invention enables several registered users having different preferences to use the same application 70 without having to re-customize the application's operation and interface. For example, a first user may have registered with an English language preference. Each time that user launches application 70, the user interface is generated using the resources corresponding to the English language parameters, as shown for example in FIG. 6. If a second user, who had registered with a Spanish language preference logs onto the application provider's web site using the same client computer 50 as the first user, the user interface will dynamically load in the Spanish language, as shown in FIG. 9. In operation, as described above, the server system 10 retrieves the second user's preference settings so that the resource manager 75, in its next communication with the server system 10, can receive the new Spanish language parameters. Using the parameters, the resource manager 75 determines whether the resources 72 needed to generate the Spanish language interface are locally stored. If the resources 72 are not locally stored, the resource manager 75 retrieves them from the server system 10. In this way, the present invention can dynamically load a user interface for multiple users of the same client computer 50. In addition, because the resource files are generally relatively small, they can be downloaded quickly to the client computer 50 and seamlessly incorporated into the application 70 at runtime.

With reference to FIGS. 3–5, it can be seen that although depicted and described with reference to one application 70, the methods of the present invention can be adapted to manage the resources of two or more applications 70. By way of example only, the customization of the user interface to a particular language preference may be applicable to several applications 70 stored on a particular client computer 50. As such, a group of applications 70 can be internationalized by using the resource manager 75 of the present invention to manage the resources 72 of several applications 70.

Figure 6:
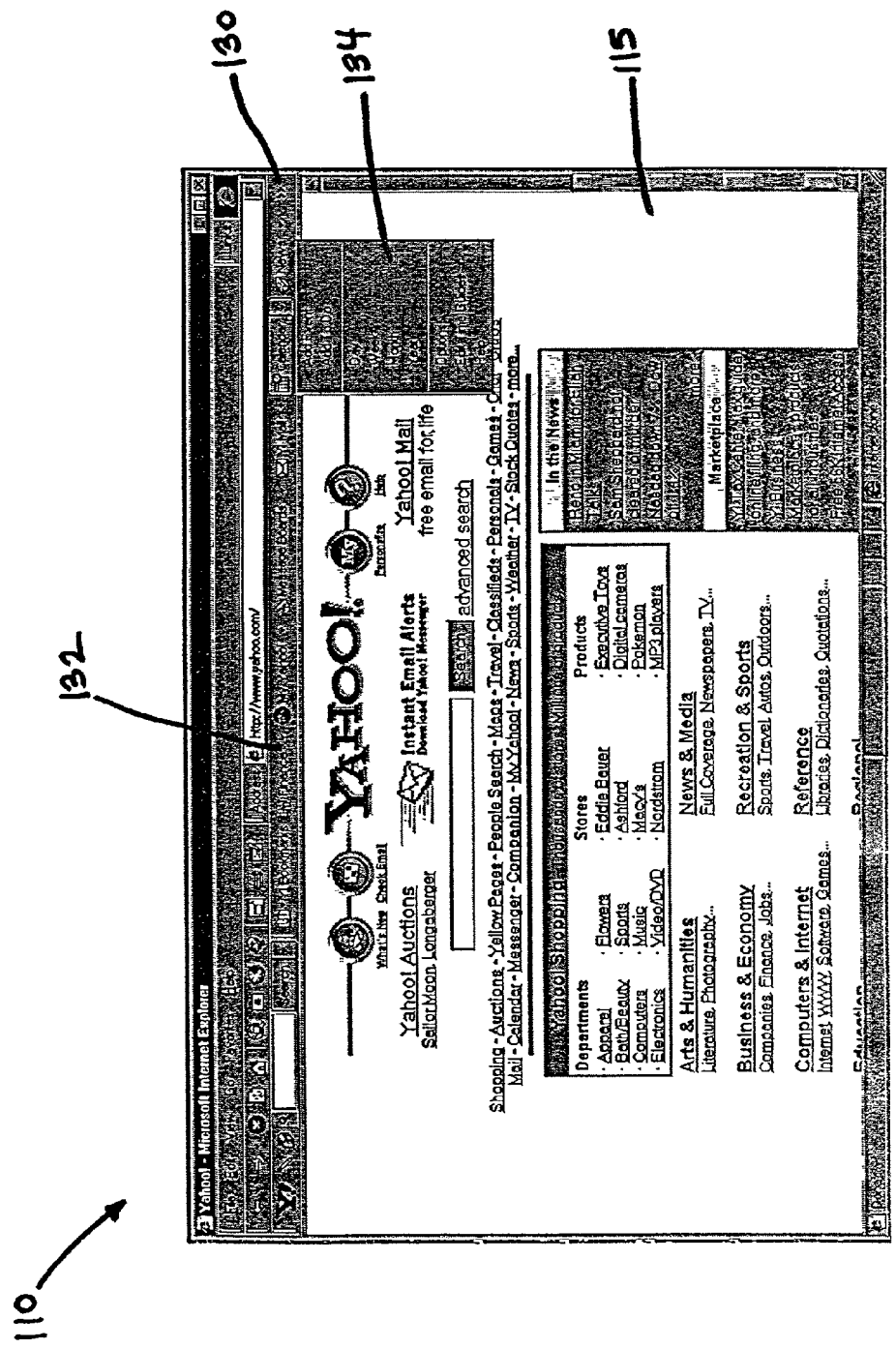
FIGS. 6–10 are exemplary screenshots of a method of internationalizing an application in accordance with the various preferred embodiments of the present invention.

Therefore, with further reference to FIGS. 1, 2, and 6–10, there is shown and herein described an exemplary method of customizing an application 70 and, in particular a method of internationalizing an application 70. As shown in FIGS. 1 and 6, a web site of a content provider is delivered to the display device 54 of the client computer 50 through the network 100. A browser application 110, such as Microsoft Internet Explorer or Netscape Navigator, interprets the downloaded content, which is in the form of images, HTML code and the like, scripting languages (e.g., Javascript, VBscript, etc.), and applets, to name a few, to generate a user interface in window 115. A component object model (COM) technology, such as for example an ActiveX Control or a Plug-in, controls and/or modifies a portion of the browser interface as shown in toolbar 130. Such a browser interface overlay is disclosed in Applicant's co-pending U.S. application Ser. No. 09/429,585, filed on Oct. 28, 1999 (now allowed but pending publication), published on Aug. 26, 2004 as U.S. Published Application Ser. No. 20040165007, the entire disclosure of which is incorporated herein by reference. The COM application links to library resources, such as DLLS, to generate the particular interface of the tools within the toolbar 130. For example, as shown, in FIGS. 6 and 7, the English language is used in the buttons 132, drop down menus 134, and message boxes 136.

Figure 8:
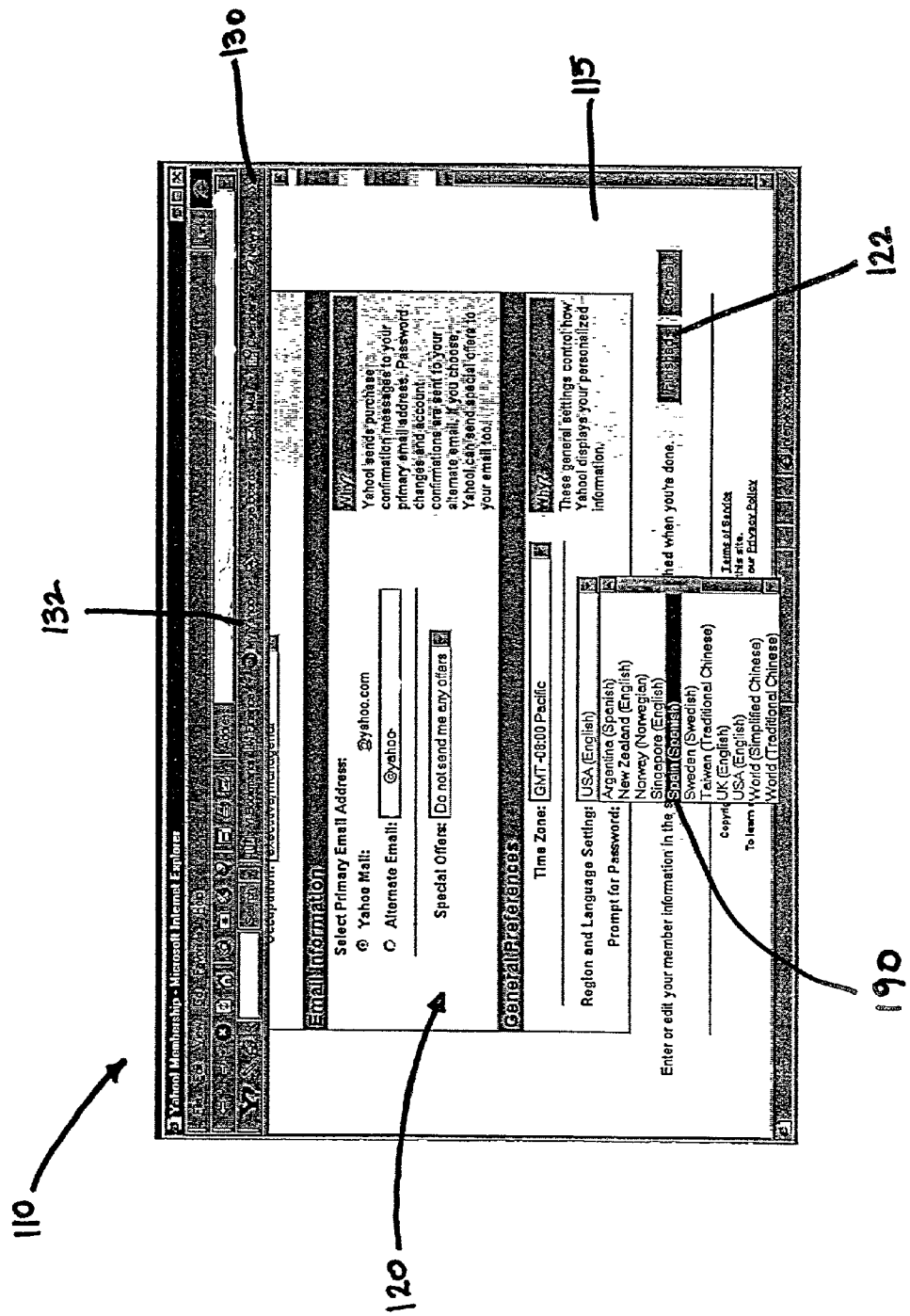

As described above, however, it may be desirable for another user of the same application 70 or users in different countries to change the language setting to their preferred language. With further reference to FIG. 8, a user is provided a preference setting screen 120 by the application/content provider. In this example, the user is changing the language setting to Spanish 190. One skilled in the art will recognize, however, that the particular type of preference setting (e.g., language, interface color, button type, tools available, etc.) for which the present invention is utilized is a matter of design choice; and, accordingly, the present invention can be adapted for any number of customizable preference settings pertaining to one or more applications 70 programmed to operate with the resource manager 75 of the present invention.

Figure 10:
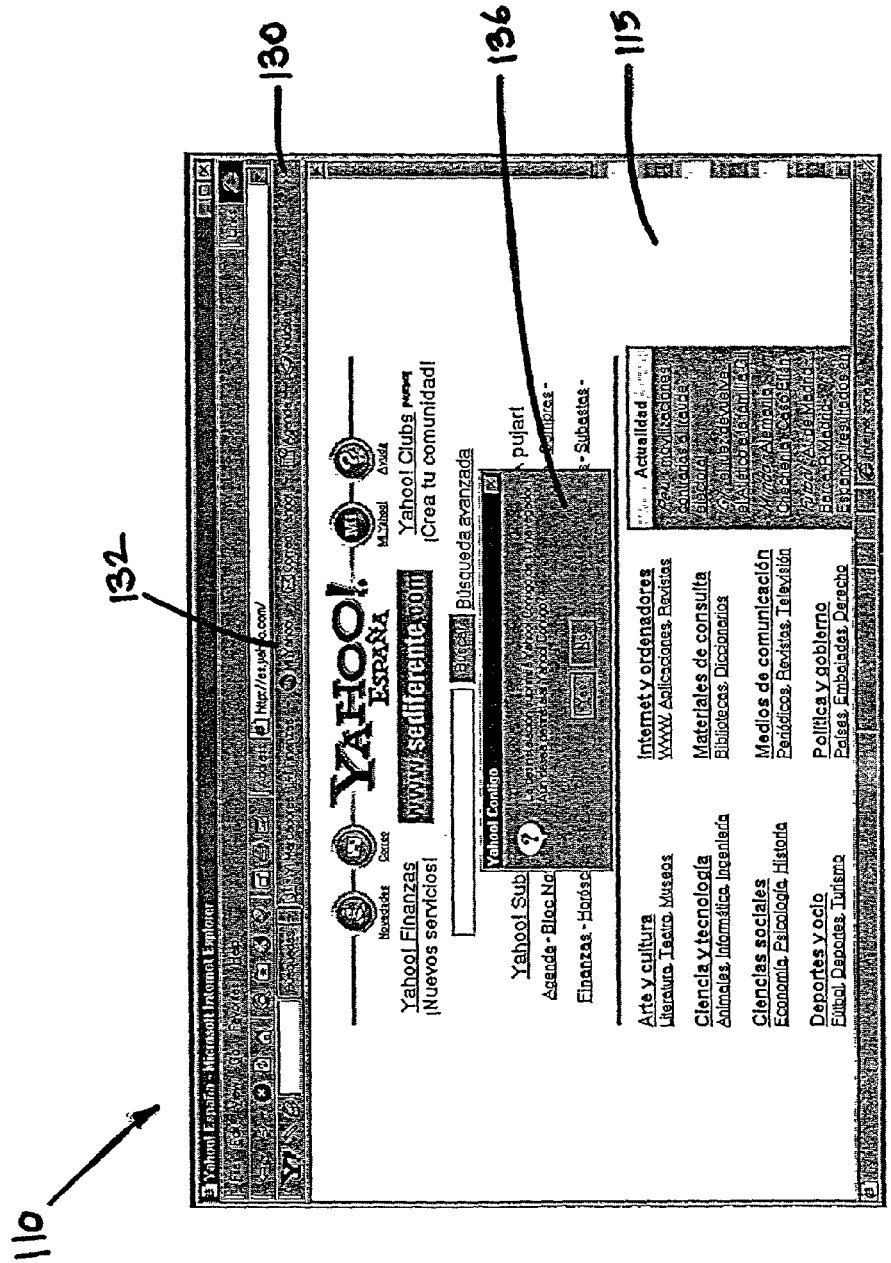

Referring again to FIG. 8, when the user has selected a preference, the user clicks the "Finished" button 122, for example, to complete the setting change. With further reference to FIGS. 9 and 10, the Spanish language replaces the English language in the buttons 132, drop down menus 134, and message boxes 136. It will be noted that the particular way in which a user can change the preference setting is not critical to the invention and the description herein is merely illustrative of one such way.

Figure 7:
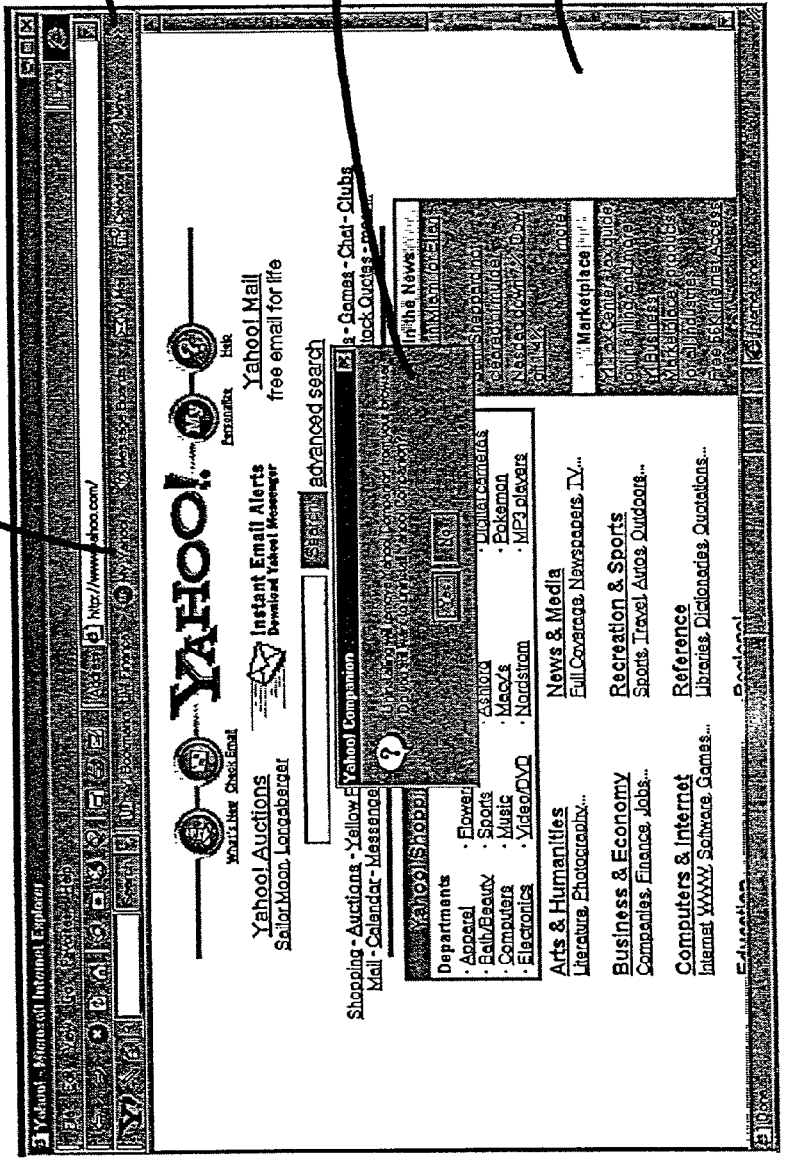

With reference again to FIGS. 6–10, toolbar 130 is generated by the execution of application 70 which links to and accesses resources 72, which include, for example, an ActiveX control or Plug-in. The resource 72 contains the code necessary to generate user interface and functionality of the toolbar 130. In use, application 70 is inter-operative with resource 72 to generate a shell within the browser 110 within which the functionality of the ActiveX control or Plug-in can be added to toolbar 130. By way of non-limiting example, the data processed to build the user interface of toolbar 130 is defined by one or more resources 72 which contain the ActiveX control or Plug-in necessary to generate the interface. For instance, the strings of text that can be seen in FIGS. 6–8, which are in English, are stored in one of the resources 72 and provided to application 70 as needed to generate the user interface of toolbar 130. Similarly, the strings of text found in message box 136 as depicted in FIG. 7 are stored in one of the resources 72 and provided to application 70 as need to generate a particular message box.

Through the application provider's web site, illustrated for example in browser window 115, a user can select a preference setting. The preference setting, as one skilled in the art will recognize, may include many different types of customizable options, such as by way of non-limiting example language. With reference to FIG. 8, the user chooses to change his/her language preference from English to Spanish. Once the user has completed changing and reviewing his/her selections, the server system 10 either communicates the group identifier associated with the group of resources needed to accommodate the request to the client computer (as described above in connection with drawing FIGS. 6 through 10) or the resource manager 75 receives a preference parameter corresponding to the resources from the server system 10 (as described in connection with drawing FIG. 5).

Upon receipt of the group identifier, resource manager 75 uses the group identifier to determine whether the group of resources associated with the group identifier is stored locally on the client computer. If, in the alternative embodiment, the resource manager 75 receives a preference parameter related to the region or language preference, the resource manager looks up the corresponding resource identifier in the resource manager's 75 map of identifiers to resources to determine whether the resources associated with the group identifier are stored locally on the client computer. Thus, if the group of resources 72 needed to generate the Spanish language toolbar 130 is not found on the client computer 50, the resource manager 75 retrieves them from the server system and passes the needed group of resources 72 to the browser application 70 so as to enable the application to access the group of resources 72, as described above. In this way, application 70 can link to the group of resources, load the text strings and image data into the memory of the client computer 50, and generate the toolbar 130 in the Spanish language.

Because the resources 72 for changing the preference setting are stored on the server system 10, a streamlined user application 70 can be delivered to the client computer 50 without having the entire library of resources 72 for each particular preference hard-coded into the application 70. Instead, the resources 72 are advantageously downloaded and dynamically integrated into the application 70 at runtime. In addition, because the resource manager 75 can manage resources 72 for more than one application 70, each application 70 can be customized in response to a change in the user preference. As such, applications can be internationalized, customized, updated, or patched in a seamless fashion without negatively impacting the user's experience. As such, there is no need to restart the application 70 upon the application 70 being internationalized, customized, updated, and/or patched.

Due to the increased convenience and functionality offered to a user, the present invention offers a means by which a web site can increase the frequency with which a user accesses the web site. According to this preferred embodiment, a user profile database 20 is maintained on the server system 10, which serves the web site to the browser application. The user profile database includes at least one customizable option. As used herein, the term "customizable option" or "preferences," refers to those options which the user may choose from and which are stored in the user profile on the server system. The server system, as described above, permits the user to change the customizable option. In response to the change in the customizable option, the client computer generates a browser interface on the client computer in the manner previously described.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of managing resources of a downloadable toolbar application downloaded from a server system to a client computer and installed on the client computer, the downloadable toolbar application having a toolbar graphical interface that is integrated into a browser application user interface, such that the toolbar graphical interface becomes a part of the browser application user interface, the downloadable toolbar application having a language attribute, the method comprising:
   (a) downloading a resource management program from the server system;
   (b) receiving at the server system a message to change the language attribute of the downloadable toolbar interface in response to a change in user preference;
   (c) receiving into the client computer, from the server system, a preference parameter associated with a group of resources needed to accommodate the request to change the language attribute of the downloadable toolbar application;
   (d) determining whether the needed group of resources to effect the requested change to the language attribute of the downloadable toolbar application is stored locally on the client computer using the preference parameter;
   (e) retrieving the needed group of resources from the server system if the needed group of resources is not stored locally on the client computer; and
   (f) modifying the toolbar graphical interface of the downloadable toolbar application using the needed group of resources to reflect the requested change to the language attribute of the downloadable toolbar application.

2. The method of claim 1, wherein the step of modifying the graphical interface of the downloadable toolbar further comprises:
   passing the needed group of resources to the downloadable toolbar application so as to enable the toolbar application to access the group of resources.

3. The method of claim 2, wherein the step f passing the needed group of resources further comprises:
   calling a function exposed by the downloadable toolbar application; and
   passing the needed group of resources to the downloadable toolbar application as an argument.

4. The method of claim 1, wherein the downloadable toolbar application:
   links to the needed group of resources to load text strings and image data into a memory of the client computer to thereby produce a modified toolbar graphical interface reflecting the requested change in the language attribute of the downloadable toolbar application using the text strings and image data.

5. The method of claim 1, further comprising:
   (g) storing the needed group of resources in a memory space of the client computer; and
   (h) passing the needed group of resources to the downloadable toolbar application so as to enable the downloadable toolbar application to access the group of resources.

6. A method of internationalizing a downloadable toolbar application deployed in a client-server environment, comprising:
   (a) downloading from a server the downloadable toolbar application;
   (b) installing the downloadable toolbar application on a client computer, and upon installation, a toolbar interface of the downloadable toolbar application being integrated within a browser application user interface, the toolbar interface having a language specific attribute;
   (c) storing on a server system the server a plurality of language specific groups of resources;
   (d) receiving at the server a message from a client computer that the downloadable toolbar application exhibits characteristics indicative of a desired language;
   (e) receiving from the server system into a resource manager on the client computer a preference parameter associated with a language-specific group of resources needed to accommodate the message;
   (f) determining whether the needed language-specific group of resources is stored locally on the client computer; and
   (g) retrieving the language-specific group of resources from the server system if the needed language-specific group of resources is not stored locally on the client computer so as to provide the language-specific group of resources to the downloadable toolbar application to generate a graphical user interface reflecting the desired language.

7. The method of claim 6, further comprising:
   passing the needed language-specific group of resources to the downloadable toolbar application so as to enable the downloadable toolbar application to access the needed language-specific group of resources.

8. The method of claim 7, wherein the step of passing the needed language-specific group of resources comprises:
   calling a function exposed by the downloadable toolbar application; and
   passing the needed language-specific group of resources to the downloadable toolbar application as an argument.

9. The method of claim 6, further comprising:
   linking to the needed language-specific group of resources;
   loading text strings and image data into memory of the client computer; and
   producing a graphical user interface using the text strings and image data.

10. The method of claim 6, further comprising:
    storing the needed language-specific group of resources in a memory space of the client computer; and
    passing the needed language-specific group of resources to the downloadable toolbar application so as to enable the downloadable toolbar application to access the needed language-specific group of resources.

11. A computer system operative with a browser application capable of accessing a network and displaying a web page received from a server system, the computer system being capable of communication with the network; the computer system comprising:

a toolbar application that is downloaded from a server system to the computer system and installed thereon, the toolbar application generating a toolbar interface having a language attribute;

a software implemented resource manager operative on the computer system to:

receive from said server system in response to a change in user preference a preference parameter associated with a needed group of resources for customizing the toolbar interface of the toolbar application according to the change of user preference;

determine, upon receipt of the preference parameter, whether the needed group of resources associated with the preference parameter is stored locally on the computer system; and retrieve the needed group of resources associated with the preference parameter from the server system if the needed group of resources is not stored locally on the client computer so that the toolbar application is enabled to generate the toolbar interface using the needed group of resources according to the change in user preference.

12. The system of claim 11, wherein the preference is a regional setting.

13. The system of claim 11, wherein the preference is a language setting.

14. The system of claim 11, wherein the generation of the toolbar interface further comprises calling a function exposed by the toolbar application, passing the needed group of resources to the toolbar application as an argument, so as to enable the toolbar application to link to the needed group of resources, load text strings and image data into a memory of the computer system, and generate the customized toolbar interface using the text strings and image data.

15. A client-server system for permitting the internationalization of a toolbar interface of a toolbar application, the toolbar application being downloadable via a network and, upon installation, the toolbar interface being integrated within a browser application user interface of a browser application; the client-server system comprising:

a server system having stored thereon a plurality of groups of resources, each of the plurality of groups associated with a preference parameter, wherein the server system maintains a user profile database for storing a language preference for a plurality of users; and a client computer interconnected to the server system through a network, the client computer having operative thereon the toolbar application and a software implemented resource manager; and wherein in response to either a change in language preference of a first user or in response to a second user with a language preference different from the first user's language preference logging in to use the toolbar application on the client computer, the server system transmits the preference parameter associated with the group of resources corresponding to the change in language preference to the client computer, such that the software implemented resource manager on the client computer can determine whether the group of resources associated with the preference parameter are stored locally on the client computer.

16. The client-server system of claim 15, wherein the group of resources is retrieved from the server system if the group of resources is not stored locally on the client computer.

* * * * *